Patented Nov. 11, 1952

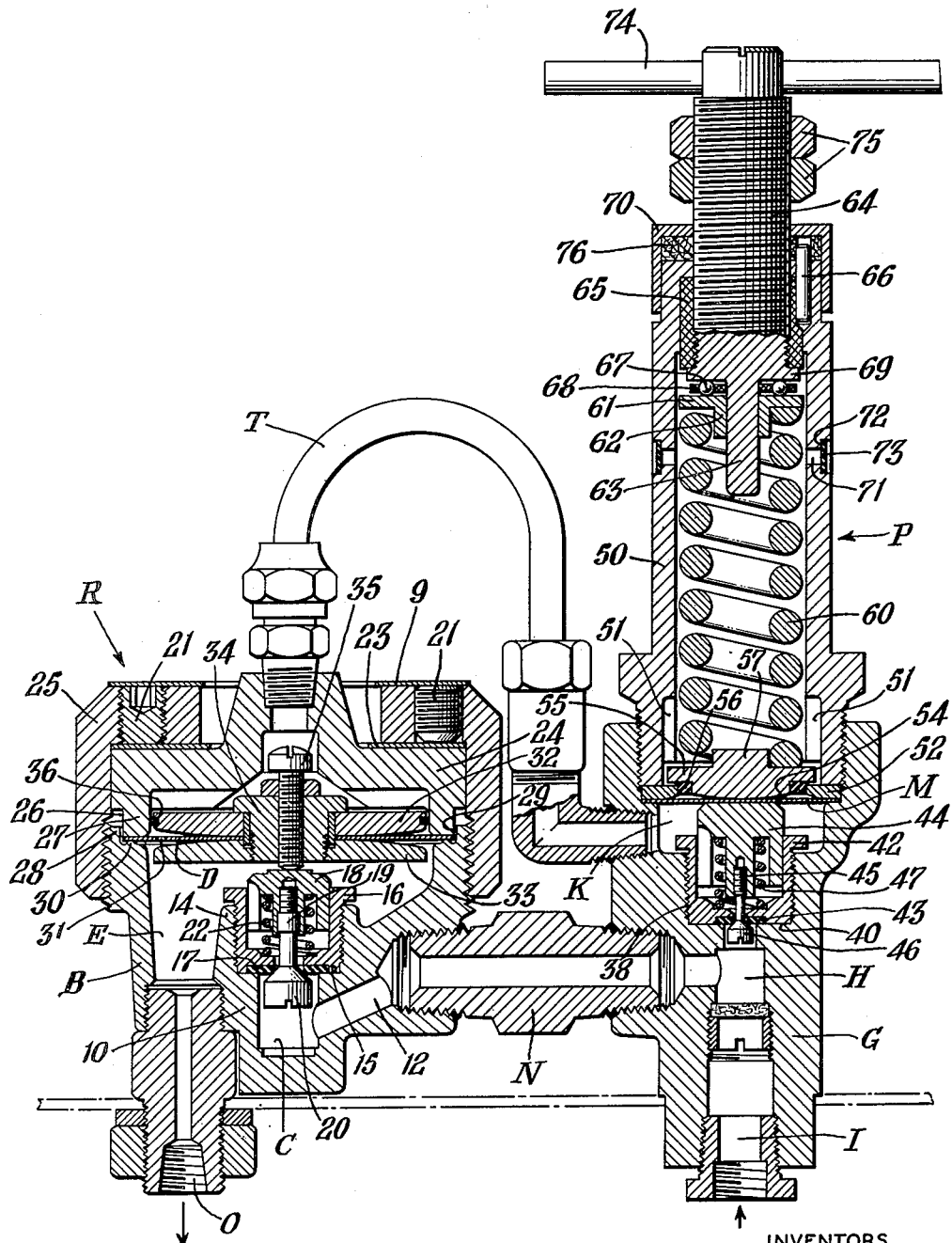

2,617,233

UNITED STATES PATENT OFFICE 2,617,233

OXYGEN TRANSFER REGULATOR

James A. Hoffman, Roselle, Samuel R. Oldham, West Orange, and Wilgot J. Jacobsson, Plainfield, N. J., assignors, by mesne assignments, to Union Carbide and Carbon Corporation, a corporation of New York Application May 3, 1945, Serial No. 591,728

3 Claims. (Cl. 50—23)

1

This invention relates to oxygen transfer regulators, and more particularly to the pilot operated type of regulator adapted to reduce the pressure of oxygen from commercial cylinders to special cylinders for breathing use, particularly for aircraft.

Breathing oxygen is generally stored in manifolded special cylinders permanently installed in the aircraft or other chamber to be supplied with breathing oxygen. The special cylinders are preferably at a pressure of about 450 pounds per square inch, whereas the commercial cylinders from which they are to be charged may be 2000 pounds per square inch or more, and the present invention is particularly adapted for this pressure reduction and transfer.

An advantage from the present combination of pilot regulator and main regulator is that in those combinations of simple construction having a bleeder hole in the main regulator diaphragm, there is much less danger of the combination being locked up or rendered inoperative by the main regulator valve being held open after stress in the spring in the pilot regulator has been released to close the main regulator. This has been accomplished by the discovery that the bleeder opening should be located adjacent the edge of the diaphragm and remote from its center where it has previously been located. Another new result in the present combination of regulators is the increased ease with which the discharge pressure of gas may be controlled or adjusted. One contributing factor to this new advantage is the use of metal and a phenol-formaldehyde resin as the complementary threaded surfaces on an adjusting screw for controlling spring pressure in the pilot valve. A further novel result in the combination of the two regulators is their adaptability for usage in both a very humid atmosphere and a dusty or blowing sand climate of a dry desert country. This last advantage has been made possible by enclosing the main regulator and the pilot regulator but sealing the adjusting screw and its housing in the pilot regulator. Yet a further new function in the present combination of pilot and main regulators is their ability to withstand temperature differences without setting up objectionable or unequal expansion stresses therebetween. A rigid connection between the two regulators is formed by a pipe nipple through which the main gas flow occurs while a gradually bent smaller pipe takes care of the bleeder flow of gas between the two regulators.

2

Among the objects of this invention may be mentioned the provision of an improved combination of pilot and main regulator of simple construction in which release of spring pressure in the pilot is more certain to produce the desired result in the main regulator by elimination of the danger of a pressure lock up holding the main regulator valve open. Another object is to increase the ease with which the pressure of the main gas discharge may be controlled. Yet a further object is to adapt the combination for satisfactory operation in any climate. Yet another object is to adapt the combination of regulators to withstand a probable substantial temperature difference due to a greater expansion and chilling occurring in one of the regulators owing to the larger quantity of gas being expanded in such one.

An object of this invention is to provide a metal diaphragm for pressure regulator having a longer life than has heretofore been expected. This is accomplished by eliminating the possibility of any sharp edge over which the diaphragm might be bent. Another object is to reduce the tendency of the diaphragm and valve to hum and at the same time have the closed cap containing the diaphragm spring capable of venting excess pressure through a check valve. Still another object is to eliminate the disadvantages of moisture and dirt affecting the regulator.

Other objects and features of novelty will be apparent as the following description proceeds with reference to the accompanying drawing, in which the single figure is a vertical section through a pilot-operated pressure regulator according to the preferred embodiment of the present invention.

The regulator shown in the drawing comprises a main regulator R and a pilot regulator P, located side by side and held together by a pipe nipple N, which serves as a high pressure connection to the main regulator from the high pressure inlet I, located in the pilot regulator P. A suitable bent tube T connects the delivery pressure chamber from the pilot regulator P with the upper side of the diaphragm chamber in the main regulator for gas pressure operation of the valve in the main regulator.

The main regulator R comprises a body B having an inlet pressure chamber C and a delivery pressure chamber E separated by a partition 10. The inlet pressure chamber C communicates with a passage 12, the outer end of which receives the nipple N. The delivery chamber E communicates with the outlet O.

The partition 10 has a central boss 14 which has a central bore of larger diameter than the chamber C, forming a shoulder 15. A valve cage 16 is screwed into the bore of the boss 14, and clamps a valve seat 17 against the shoulder 15. A valve guide 18 is slidably mounted in the cage 16, and carries a valve stem 19 having a valve head 20 engaging the underside of the seat 17. A valve closing spring 22 is interposed between the valve cage 16 and the valve guide 18.

A diaphragm D preferably constructed of fine silver, is clamped between the rim of the body B and the margin of a cover 24, which is held in place by a cap nut 25. The cover 24 and cap 25 both function as a diaphragm clamping cap. The top of the cap nut 25 carries an annular series of screws 21, which engage a wear plate 23 interposed between the cap or cover 24 and the top of the cap nut 25. The underside of the margin of the cover 24 has an outer annular groove 26 and an inner depending ring 27, and the rim of the body B has an outer flange 28 and an inner groove 29, an annular ridge 30 being formed at the bottom of the groove.

In assembling the main regulator R, the diaphragm D and the parts carried thereby are dropped into the body B, with the margin of the diaphragm in the groove 29 and resting on the annular ridge 30. The cap nut 25 is screwed on by hand, the cap 24 sliding therein so as to avoid rotation, until the inside of the top of the cap comes to rest on the wear plate 23. Then the screws 21 are tightened in succession to effect the desired compression or clamping of the diaphragm between the ring 27 and the ridge 30 as an annular fulcrum. Then the screws 21 may be covered by a cover plate 9, such as a name plate.

For proper functioning of the pilot regulator, a small flow of gas is permitted through the main regulator R by means of a bleeder hole 31 in the main regulator diaphragm D. This hole is located as far away from the center of the diaphragm as possible to eliminate the effect of velocity pressure upon the diaphragm and thereby also preventing pressure lock-up in the main regulator which otherwise would prevent the system from being shut off when the pressure adjusting screw 64 is released.

The diaphragm D has upper and lower backing plates 32 and 33, both curved outwardly away from the diaphragm in approximately spherical form, to avoid sharp breakage corners or abrupt localization of force. A central bushing 34 passes through the upper backing plate and the diaphragm, and is screwed into the lower backing plate to hold the parts together. A tappet screw 35 is threaded into a central bore in the bushing 34. The valve in this main stage is of the detached stem type. There is no need of attachment because overloading cannot be introduced.

The upper bearing plate 32 has a groove in its periphery, which receives a pentagonal ring 36 of spring wire forced into the groove corner, which ring rides against the inner wall of the ring 27, and serves as a hum snubber.

The pilot regulator P comprises a body G having an inlet pressure chamber H and a pilot pressure chamber K separated by a partition 38. The partition 38 has a central bore of reduced diameter forming a shoulder 40. A valve cage 42 is screwed into the bore and clamps a valve seat 43 against the shoulder 40. A valve guide 44 is slidably mounted in the cage 42 and carries a valve stem 45 having a valve head 46 engaging the underside of the seat 43. A valve closing spring 47 is interposed between the valve cage 42 and the valve guide 44.

The valve body G is expanded and threaded to receive a cap or barrel 50; and a diaphragm M of suitable flexible material, preferably three layers of fine silver sheet, is clamped between a shoulder inside the valve body G and a ring 52. The lower rim of the barrel 50 clamps on the top of the ring 52 when the cap is tightened, to protect the diaphragm from rotary movement. The lower side of the ring 52 is spherically rounded to avoid sharp breakage corners.

The lower side of the diaphragm M directly engages the valve guide 44. The upper side is centrally engaged by a spherical bearing surface 54 of a bearing member 55, the outer rim of which is slightly smaller than the inner wall of the cap or barrel 50. The inside of the barrel 50 is provided with splines 51, which serve as a stop to limit upward movement of the bearing member 55, yet permit escape of gas in the event of rupture of the diaphragm. The downward movement of the bearing member 55 is limited by the upper flat side of the ring 52, which serves as a stop.

The under bearing portion 54 is smaller than the ring 52 and carries a resilient ring 56 of synthetic rubber or the like. It should be noted that the underside of the ring 52, the surface 54 and the rubber 56, form a smooth curve for supporting the diaphragm against blowout, there being no sharp breakage corners to be engaged by the diaphragm.

The upper side of the bearing member 54 has a spring locating projection 57 for engagement by a lower end of a coil compression spring 60. The upper end of the spring 60 bears against an upper bearing member 61 which has a depending centrally bored spring locating boss 62. This bore slidably receives a guide stem 63 extending downwardly from the lower end of a spring adjusting screw 64, threaded in a nut 65.

The nut 65 is formed of a plastic such as phenol-formaldehyde resin, preferably reinforced with fabric or the like, which withstands wear in operation when in threaded engagement with the metal screw 64. The nut 65 is pressed into the upper end of the cap 50 and is secured against rotation by pins 66. Hardened stainless steel ball bearings 67 are mounted in holes in a washer 68 of plastic such as phenol-formaldehyde resin and forming a race for the ball bearings, and are interposed between a shoulder 69 on the screw 64 and the bearing member 61.

The upper end of the cap 50 is sealed by a leather washer 76 treated with a lubricating compound such as carnauba wax. This washer is clamped down by a sleeve 70, which has a clearance for the threads of the screw 64, and is a press fit on the outside of the cap 50. The central hole in this washer is cut smaller than the threads on the screw 64 so that the screw cuts its own threads in the washer and effects a tight seal. No moisture or dirt can pass this leather washer. The shoulder 69 is of larger diameter than the nut 65, so as to prevent removal of the screw 64 which is inserted from inside the cap 50 in assembly.

The sides of the cap 50 are provided with vent holes 71 formed in an annular groove 72. A flexible band 73 of rubber or the like is snapped into this groove to cover the openings 71 and permits escape of gas in event of rupture of the diaphragm M, but otherwise creates a seal to the atmosphere so that no moisture can get inside the cap, and also helps to prevent humming.

The adjusting screw 64 is provided with an operating handle 74 and carries a pair of lock nuts 75 which may be set to engage the top of the sleeve 70 at a predetermined maximum pressure.

It will be noted that both regulators are of the detached stem type for valve sealing when the pressure adjusting screw is released, and with properly fitted valve stem guides for friction to prevent humming. By using stem type construction, freezing fluctuations are minimized. The large gas passages used are also a help in this respect.

Having thus described our invention, we claim:

1. In a pressure regulator, a casing having a pressure chamber therein provided with an inlet and an outlet, a cap for said casing, a metal diaphragm between said casing and said cap, a spring in said cap for urging said diaphragm against pressure in said chamber, a valve actuated by said diaphragm and having a seat between said inlet and said chamber, a metal ring with its side contiguous said diaphragm being curved away from said diaphragm and inwardly, a bearing member between said spring and diaphragm and having a central bearing surface curved away from said diaphragm and outwardly, and a resilient ring fitted radially between said metal ring and said bearing member, said metal ring, resilient ring and bearing member having their sides contiguous the diaphragm forming a smooth continuous surface for supporting said diaphragm against rupture by excessive pressure.

2. A regulator having a diaphragm, an adjustable spring cooperating with said diaphragm, a fluid pressure valve responsive to movement of said diaphragm, a bearing member between said spring and diaphragm, the edge of the diaphragm being clamped between a cap and a body portion of the regulator, a ring clamped contiguous the face of the diaphragm contacted by said bearing member, and a resilient ring radially between said bearing member and ring forming a smooth surface in prolongation of each, one of said bearing member and ring being provided with a flange extending behind said resilient ring to hold the same in position and form a groove having gradually and smoothly curved sides into which the diaphragm is adapted to be bent.

3. In a pressure responsive valve including a casing, inlet and outlet passages in the casing, a valve between said passages, a cap for said casing, a metal diaphragm clamped between said casing and cap, a bearing member secured to said diaphragm on its side away from said casing, a stem between said diaphragm and valve for moving said valve in response to flexure of said diaphragm, and means for opposing pressure on the casing side of said diaphragm, the combination therewith of the improvement for prolonging the life of the metal diaphragm against rupture due to its being overstressed in being bent around an edge or into a crevice between said cap and bearing member, said improvement comprising the bearing member having a surface radially outward sloping away from said diaphragm, said cap portion contiguous said diaphragm having a surface sloping radially inward and away from said diaphragm, and a resilient ring radially between and at the extremities of said sloping surfaces prividing a substantially smooth surface in continuation of each sloping surface.

JAMES A. HOFFMAN.
SAMUEL R. OLDHAM.
WILGOT J. JACOBSSON.

REFERENCES CITED

The following references are of record in the file of this patent:

UNITED STATES PATENTS

| Number | Name | Date |
|---|---|---|
| 489,515 | Wood | Jan. 10, 1893 |
| 586,158 | Bradley | July 13, 1897 |
| 763,162 | Curran | June 21, 1904 |
| 827,998 | Schutte | Aug. 7, 1906 |
| 841,469 | Turner | Jan. 15, 1927 |
| 841,924 | Bleoo | Jan. 22, 1907 |
| 871,260 | Dyer | Nov. 19, 1907 |
| 1,071,777 | Murphy | Sept. 2, 1913 |
| 1,326,445 | Fewlass | Dec. 30, 1919 |
| 1,410,089 | Wilkins | Mar. 21, 1922 |
| 1,461,248 | McConnell | July 10, 1923 |
| 1,603,112 | Jenkins | Oct. 12, 1926 |
| 1,620,582 | Thrush | Mar. 8, 1927 |
| 1,637,764 | Coles | Aug. 2, 1927 |
| 1,659,263 | Harris | Feb. 14, 1928 |
| 1,701,865 | Soderberg | Feb. 12, 1929 |
| 1,739,926 | Stettner | Dec. 17, 1929 |
| 1,891,547 | Krichbaum | Dec. 20, 1932 |
| 2,067,510 | Spence | Jan. 12, 1937 |
| 2,362,352 | Buttner | Nov. 7, 1944 |
| 2,370,245 | Jacobsson | Feb. 27, 1945 |
| 2,447,695 | Folke | Aug. 24, 1948 |

FOREIGN PATENTS

| Number | Country | Date |
|---|---|---|
| 156,132 | Austria | of 1939 |